April 2, 1963 L. H. VON OHLSEN 3,084,233
LIMIT SWITCH FOR BAND SAW OR THE LIKE
Filed June 6, 1960 2 Sheets-Sheet 1

INVENTOR
Louis H. Von Ohlsen
BY
ATTORNEYS

April 2, 1963 L. H. VON OHLSEN 3,084,233
LIMIT SWITCH FOR BAND SAW OR THE LIKE
Filed June 6, 1960 2 Sheets-Sheet 2
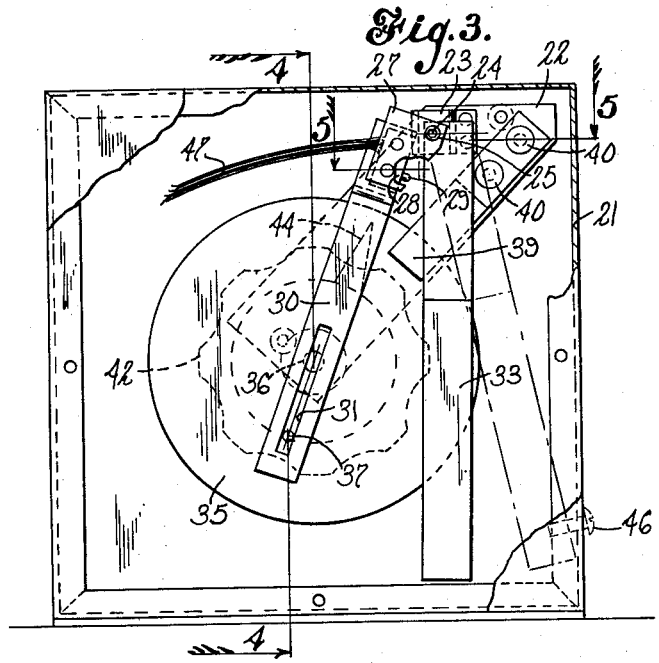
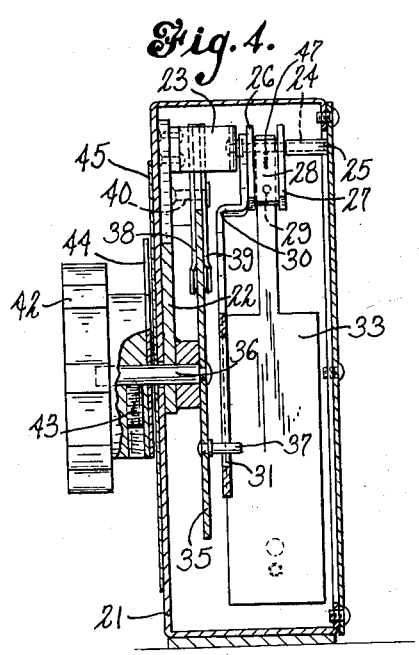
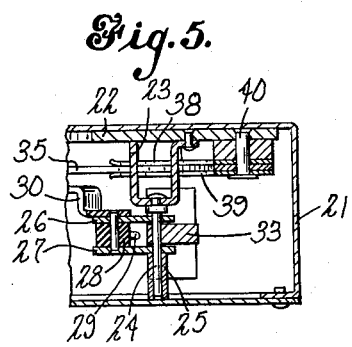
INVENTOR
Louis H. Von Ohlsen
BY
ATTORNEYS

United States Patent Office 3,084,233
Patented Apr. 2, 1963

1

3,084,233
LIMIT SWITCH FOR BAND SAW OR THE LIKE
Louis H. Von Ohlsen, Hamden, Conn., assignor to The
H. G. Thompson & Son Company, New Haven, Conn.,
a corporation of Connecticut
Filed June 6, 1960, Ser. No. 34,291
7 Claims. (Cl. 200—61.52)

This invention relates to a switch mechanism for controlling the operation of the tiltable head of a band-sawing machine, and particularly adapted to use with a band-sawing machine for cutting metal bars or similar workpieces into sections.

In a machine for the character to which the invention is applied, as illustrated in the accompanying drawings, a frame or base is provided upon which the work is mounted. As illustrated, the work consists of a bar adapted to be cut transversely into sections and means are provided to index the bar or advance it longitudinally so as to present it to the saw. The workpiece is held by clamps and a band saw is provided upon a head which is pivoted to the base or frame. Means are provided, usually hydraulic, for raising the head about its pivot to withdraw it from the work, and the latter is then advanced while the head and saw are raised. The head may then be permitted to descend by gravity, during which time the endless saw is actuated to cut a section from the workpiece. The head is again raised and the operation repeated.

When such machines are automatically operated, the head will be raised to a position to clear the workpiece so that it may be advanced under the saw and, when this has been done, the movement of the head is either stopped or reversed so that it may descend and perform another cutting operation. It will be seen that it is desirable to stop the upward movement of the head as soon as it clears the workpiece and, as the devices are used with bars or workpieces of various diameters, it is desirable to be able to adjust the mechanism so that the upward movement of the head will be checked as soon as it is above the level of the workpiece in order that the machine be operated at maximum speed. That is to say, if a 1- or 2-inch bar is being cut, it will be unnecessary to raise the head to the extent required to clear a bar of 4 or 5 inches in diameter.

The present invention relates particularly to a switch which may be mounted on the tilting head of a machine of this character which will check the upward movement of the head and which may be adjusted so that it will act at any desired position of the head depending upon the diameter or thickness of the workpiece. Preferably the switch will not only control an electrical circuit which controls the raising movement of the head, but will also energize an electrical circuit which controls the indexing means so that when the upward movement of the head is checked, the work will be indexed for another operation.

One object of the present invention is to provide a new and improved means for controlling the movement of the head of a band saw machine of the character described.

Still another object of the invention is to provide switch means for controlling the movement of the pivoted head of a band-sawing machine, the mechanism being adjustable to check the upward movement of the head at predetermined points.

2

A further object of the invention is to provide a gravity-actuated switch which may be mounted upon the tilting head of a band-sawing machine which may be adjusted to operate when the head reaches a predetermined position in its upward movement, the adjustment being readily effected manually by the operator of the machine.

Still another object of the invention is to provide a switch mechanism of the character described above wherein means are provided for indicating to the operator the position of adjustment of the switch and the diameter or thickness of the workpiece for which the setting is adapted.

To these and other ends the invention consists in the novel features and combinations of parts to be hereinafter described and claimed.

In the accompanying drawings:

FIG. 3 is a rear elevational view with the cover of the casing broken away to show the interior mechanism;

FIG. 4 is a sectional view on line 4—4 of FIG. 3; and

FIG. 5 is a fragmentary sectional view on line 5—5 of FIG. 3.

Figure 1:
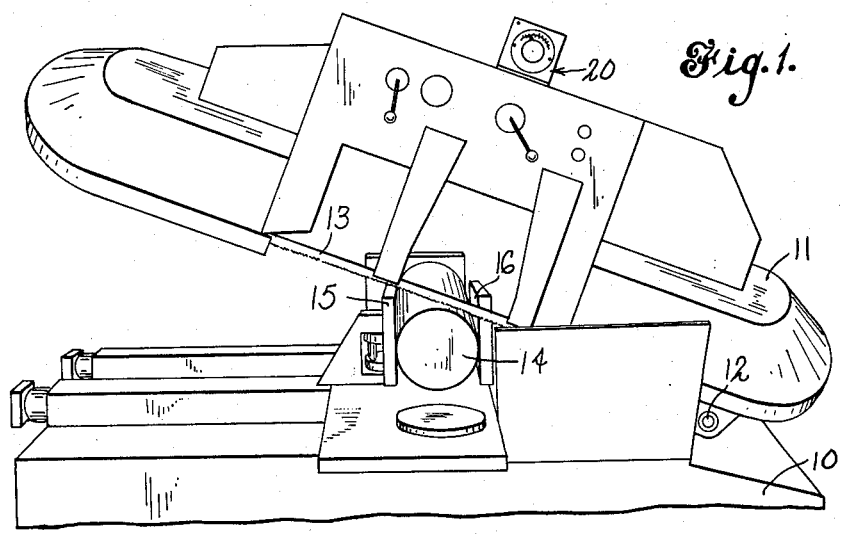
FIG. 1 is a somewhat diagrammatic view of a portion of a band-sawing machine to which my improved switch is applied.

To illustrate one embodiment of my invention I have shown in the drawings a band saw machine having a base 10 to which a head 11 is pivoted at 12. The head carries an endless saw 13 which may be actuated by the usual mechanism, not shown. The workpiece is shown at 14 which is supported upon the base 10 and held between clamping members 15 and 16. The above mechanism is of the usual construction, and it will be understood that means are provided for indexing or advancing the workpiece under the saw so that sections can be cut therefrom, and also means, usually hydraulic, is provided for raising the head about the pivot 12 to clear the work so that the latter may be advanced after a section has been cut therefrom. As usual the head may be permitted to lower by gravity.

Mounted upon the head 11 is a gravity-actuated switch mechanism indicated generally at 20 in FIG. 1 so that the mechanism will be tilted when the head is raised. As shown more especially in FIGS. 3 and 4, this mechanism comprises a casing or frame 21 having a supporting plate 22 secured to a wall thereof. Secured to this plate is a U-shaped bracket 23 carrying a pivot pin 24 which is rigidly secured to the bracket and which projects toward the other wall of the casing to be received in a spacing sleeve 25.

Pivoted upon the pin 24 are spaced plates 26 and 27 between which is mounted a switch 28. This switch is of the usual microswitch type provided with a spring-pressed plunger 29 to actuate the switch mechanism (not shown).

Secured to the plate 26 is an arm 30 extending downwardly, as shown in FIG. 3, and provided adjacent its lower end with a longitudinal slot 31 by means of which it may be swung about the pivot pin 24 as it will be obvious that the arm is pivotally mounted on this pin by virtue of its connection with the pivoted plate 26.

Also pivoted upon the pin 24 is a pendulous gravity-actuated switch-actuating member 33, this member being weighted at its lower end by being enlarged. The upper end of this pendulum is pivoted on the pin 24 between the plates 26 and 27 so as to swing freely upon the pin and is adapted to engage and disengage the switch plunger 29 depending upon the position of the switch-carrying arm 30 and the angle at which the head may be tilted or raised.

A disklike member 35 is rotatably mounted upon the wall of the casing by the shaft 36, and upon its face is provided a pin 37 in a position eccentric to the shaft 36, which pin is received within the slot 31 of the arm 30. With this arrangement, it will be seen that when the disk 35 is rotated, the arm 30 will be set at various angular positions within the casing, the arm swinging about the pin 24.

In order to frictionally hold the arm 30 in any position to which it has been adjusted, a pair of flat spring members 38 and 39 are secured to the plate 22 by the pins 40 (FIG. 5) and, as shown in FIG. 4, the free ends of these spring members engage upon opposite sides of the disk 35 to frictionally hold it in any adjusted position.

Figure 2:
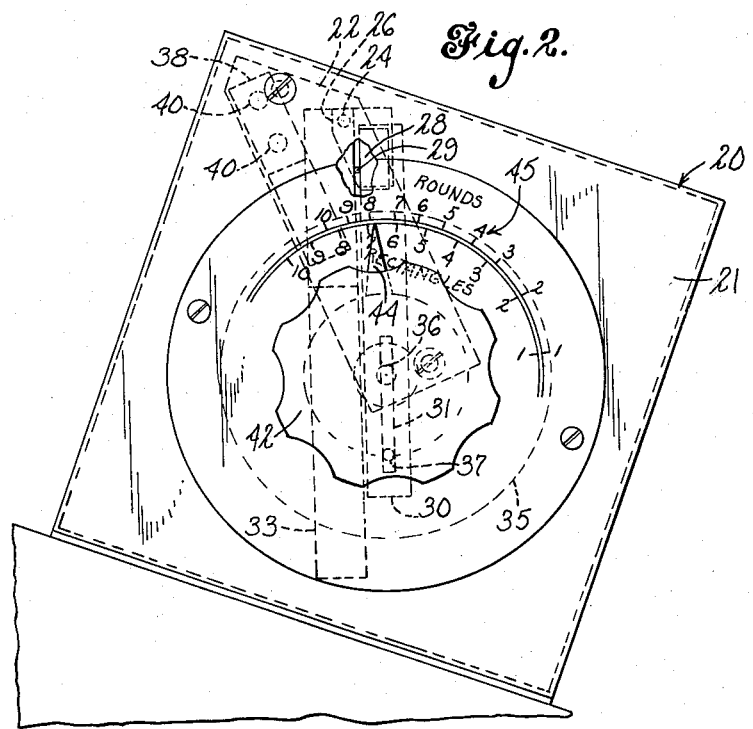
FIG. 2 is an enlarged front elevational view of the switch mechanism.

The shaft 36 extends without the casing at the front thereof, as shown in FIG. 4, and is provided with a knob 42 by which it may be rotated, the knob being secured to the shaft by the set screw 43. A pointer or indicator 44 is secured to the knob so as to rotate therewith, this pointer cooperating with a scale 45 (FIG. 2) provided upon the outer face of the front wall of the casing. Rotation of the knob 42 effects rotation of the disk 35, and through the pin-and-slot connection 37 and 31 moves the switch-carrying arm 30 about the pivot pin 24 to set the switch at a desired distance from the pendulum 33. It will, of course, be understood that in the lowermost position of the head 11, when it is substantially horizontal, the casing will stand in the position shown in FIG. 3 wherein the pendulum 33 is substantially vertical. As the pendulum is free to swing about its pivot, it may be moved to the dotted-line position shown in FIG. 3 and secured in this position by the screw 46 for shipping the mechanism from place to place. The member 30 will, of course, be held in any position to which it is moved by the friction or brake members 38 and 39.

Wires 47 lead from the switch to the control mechanism for raising the head so as to shut off the power to this mechanism when the head has been raised to the inclined position necessary to bring about engagement of the pendulum 33 with the switch plunger 29. These wires also lead to the mechanism for feeding or indexing the workpieces so that when the head has been raised to a position to clear the work, it will be elevated no further and the work will be indexed prior to the descent of the head.

In the use of the device the knob 42 is turned to the position wherein the pointer will lie opposite a number of the scale 45, indicating the diameter or thickness of the work which is to be cut. Presumably at this time the parts will lie in the position shown in FIG. 3, the head being in a substantially horizontal position. This movement of the knob 42 will move the arm 30 to the required angular position with respect to the vertical so that when the head has been raised or tilted to the position at which the saw will clear the workpiece, the pendulum will have moved by gravity to the position shown in dotted lines in FIG. 2 and engage the plunger 29 to check the movement of the head and actuate the indexing or feeding mechanism and the workpiece.

While I have shown and described a preferred embodiment of my invention, it will be understood that it is not to be limited at all of the details shown, but is capable of modification and variation within the spirit of the invention and within the scope of the claims.

What I claim is:

1. A switch mechanism for installation on a tilting member adapted to close an electric circuit when said member is tilted to a predetermined angle, said mechanism comprising a frame, electric switch means carried on an arm pivotally mounted on the frame, a pendulous switch-actuating member pivoted on the frame adjacent said switching means and adapted to actuate said switching means when said member is tilted to a predetermined angle, said switching means being pivotally mounted on the frame for pivotal adjustment to various angular positions with respect to the pendulous member when the latter is in a substantially vertical position, and means for selectively adjusting the angular position of said switching means with respect to said pendulous member to thereby predetermine the tilting angle of the member necessary to actuate said switching means, said means for adjusting comprising an adjusting member rotatably mounted on said frame and linkage means connecting said adjusting member to said arm to produce rotation of said arm upon rotation of said adjusting member.

2. A switch mechanism as recited in claim 1 wherein said arm and said pendulous member are pivotal about the same axis.

3. A switch mechanism for installation on a tilting head of a machine, said mechanism comprising a frame, an arm pivotally mounted on the frame, electric switch means mounted upon said arm, a switch-actuating pendulum pivoted on the frame adjacent said switch means and adapted to actuate the switch means when the head of the machine is tilted to a predetermined angle, and means for adjusting the angular position of said arm with respect to said pendulum when said pendulum is in a vertical position to vary the predetermined angle to which the head of the machine is tilted in order for said switch-actuating pendulum to actuate the switch, said means for adjusting comprising an adjusting member rotatably mounted on said frame and linkage means connecting said adjusting member and said arm to produce rotation of said arm upon rotation of said adjusting member.

4. A switch mechanism for installation on a tilting head of a machine, said mechanism comprising a frame, an arm pivotally mounted on the frame, an electric switch mounted upon said arm, a switch-actuating pendulum pivoted on the frame adjacent said switch and adapted to actuate the switch when the head of the machine is tilted to a predetermined angle, means for adjusting the angular position of said arm with respect to said pendulum when said pendulum is in a vertical position to vary the predetermined angle to which the head of the machine is tilted in order for said switch-actuating pendulum to actuate the switch, said means for manually adjusting said arm comprising a member rotatably mounted on the frame and having a pin thereon eccentric to its axis of rotation, said arm having an elongated slot to receive said pin therein.

5. A switch mechanism for installation on a tilting head of a machine, said mechanism comprising a frame, an arm pivotally mounted on the frame, an electric switch mounted upon said arm, a switch-actuating pendulum pivoted on the frame adjacent said switch and adapted to actuate the switch when the head of the machine is tilted to a predetermined angle, means for adjusting the angular position of said arm with respect to said pendulum when said pendulum is in a vertical position to vary the predetermined angle to which the head of the machine is tilted in order for said switch-actuating pendulum to actuate the switch, means for manually adjusting said arm comprising a member rotatably mounted on the frame and having a pin thereon eccentric to its axis of rotation, said arm having an elongated slot to receive said pin therein, and means for retaining said rotatable member in a selected position.

6. A switch mechanism for installation on a tilting head of a machine, said mechanism comprising a frame, an arm pivotally mounted on the frame, an electric switch mounted upon said arm, a switch-actuating pendulum pivoted on the frame adjacent said switch and adapted to actuate the switch when the head of the machine is tilted to a predetermined angle, means for adjusting the angular position of said arm with respect to said pendulum when said pendulum is in a vertical position to vary the predetermined angle to which the head of the machine is tilted in order for said switch-actuating pendulum to actuate the switch, means for manually adjusting said arm comprising a member rotatably mounted on the frame and having a pin thereon eccentric to its axis of rotation, said arm having an elongated slot to receive said pin therein, said frame comprising a casing, manually operable means external of the casing for rotating said rotatable member, an indicator carried by said manually operable means, and a scale on the exterior of the casing with which said indicator cooperates.

7. A switch mechanism for installation on a tilting head of a machine, said mechanism comprising a frame, a switch-mounting arm pivoted to said frame adjacent one end of said arm, a switch mounted on said switch-mounting arm, a pendulous switch-actuating member pivoted to said frame adjacent said switch and adapted to actuate said switch when said tilting head is tilted to a predetermined angle, means for adjusting the angular position of said arm and said pendulous member, said means for adjusting comprising an adjusting member rotatably mounted on said frame and linkage means connecting said adjusting member and said arm to produce rotation of said arm upon rotation of said adjusting member.

References Cited in the file of this patent
UNITED STATES PATENTS

| | | |
|---|---|---|
| 2,430,935 | Klug | Nov. 18, 1947 |
| 2,676,219 | Haynes | Apr. 20, 1954 |
| 2,708,226 | Dixon | May 10, 1955 |
| 2,711,462 | Rouse | June 21, 1955 |
| 2,759,056 | Challman | Aug. 14, 1956 |
| 2,787,679 | Moretz | Apr. 2, 1957 |
| 2,947,830 | Goss | Aug. 2, 1960 |